US011091077B2

(12) United States Patent
Karges et al.

(10) Patent No.: US 11,091,077 B2
(45) Date of Patent: Aug. 17, 2021

(54) RETAINING ARRANGEMENT FOR A VEHICLE SEAT

(71) Applicant: LEAR CORPORATION, Southfield, MI (US)

(72) Inventors: Mark Karges, Macomb, MI (US); Thomas Blicharz, Livonia, MI (US); Paul Petrous, Royal Oak, MI (US); Nizar Freijy, Oxford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/902,507

(22) Filed: Jun. 16, 2020

(65) Prior Publication Data
US 2021/0061147 A1 Mar. 4, 2021

Related U.S. Application Data

(60) Provisional application No. 62/893,983, filed on Aug. 30, 2019.

(51) Int. Cl.
*B60N 2/58* (2006.01)

(52) U.S. Cl.
CPC .................. *B60N 2/5825* (2013.01)

(58) Field of Classification Search
CPC ...... B60N 2/5825; B60N 2/5883; B60N 2/58; B60N 2/5816; B60N 2/5891; B60N 2/609; B60N 2/68; A47C 31/023; B60R 13/0206; F16B 2/22; F16B 5/0692; F16B 5/0635
USPC .................................................... 297/452.58
See application file for complete search history.

(56) References Cited

U.S. PATENT DOCUMENTS

| | | | | |
|---|---|---|---|---|
| 5,195,222 A * | 3/1993 | Rink | .................... | A47C 31/023 24/581.1 |
| 7,073,693 B2 * | 7/2006 | Law | .................... | B60N 2/5883 223/50 |
| 8,622,432 B2 * | 1/2014 | Bloomberg | ............ | B42D 3/002 281/21.1 |
| 8,714,596 B1 * | 5/2014 | Bloomberg | ............... | B42B 4/00 281/27.3 |
| 10,065,577 B2 * | 9/2018 | Braggion | ............... | F16B 5/0692 |
| 10,383,407 B2 * | 8/2019 | Mahe | .................. | A44B 18/0061 |
| 10,493,880 B2 * | 12/2019 | Lafferty | ............... | B60N 2/5825 |
| 2003/0079319 A1 * | 5/2003 | McAllister | ................ | B65F 1/06 24/536 |
| 2006/0242805 A1 * | 11/2006 | Coleman | ............. | G09F 15/0025 24/462 |
| 2012/0272483 A1 * | 11/2012 | Moore | .................... | A42B 1/247 24/3.3 |
| 2015/0052711 A1 * | 2/2015 | Boyer | .................. | G09F 13/0404 24/499 |

(Continued)

FOREIGN PATENT DOCUMENTS

DE          10359556 A1    7/2005

*Primary Examiner* — Shin H Kim
(74) *Attorney, Agent, or Firm* — Brooks Kushman P.C.

(57) ABSTRACT

A retaining arrangement for a vehicle seat that has a support structure and a cover material includes a first leg having at least one first retention feature, and a second leg connected to the first leg. The second leg includes a plurality of second retention features positioned along a length of the second leg. The second leg is configured to cooperate with the first leg to capture a portion of the support structure between the first leg and second leg.

18 Claims, 5 Drawing Sheets

(56) References Cited

U.S. PATENT DOCUMENTS

| | | | |
|---|---|---|---|
| 2016/0198811 A1* | 7/2016 | Mahe | B60N 2/5841 |
| | | | 24/444 |
| 2016/0280107 A1* | 9/2016 | Sato | B60N 2/5891 |
| 2017/0240082 A1* | 8/2017 | Yokoyama | B60N 2/58 |
| 2021/0061147 A1* | 3/2021 | Karges | B60N 2/5825 |

* cited by examiner

RETAINING ARRANGEMENT FOR A VEHICLE SEAT

CROSS-REFERENCE TO RELATED APPLICATIONS

This application claims the benefit of U.S. provisional application Ser. No. 62/893,983 filed Aug. 30, 2019, the disclosure of which is hereby incorporated in its entirety by reference herein.

TECHNICAL FIELD

The present disclosure relates to a retaining arrangement for a vehicle seat.

BACKGROUND

Vehicle seats are often configured with a support structure or seat frame, a cushion material such as foam, and a cover material disposed around an outside of the cushion material. A cover material may be attached to a seat in any number of ways, for example, with adhesives, hook-and-loop fasteners, hog rings, etc. When an end of the cover material is pulled tightly around the cushion material it needs to be firmly attached to a portion of the seat. In some vehicle seats, a J-shaped or U-shaped clip is attached to an end of the cover material and after the cover material is pulled tightly around the cushion material, the clip is fastened to a portion of the seat frame. The seat frame may be specifically configured to accommodate such a clip, for example, by having flanges or tabs that cooperate with the clip. Because seat frames vary in size, a clip that works well to attach a cover material to one seat frame may not work with another seat frame. Manufacturing and stocking a wide variety of clips in different sizes may be inefficient and uneconomical. Even when clips are configured for use on a single seating system, variations in manufacturing—in both the seat frame and the clip—may lead to a tolerance stack-up that results in a poor fit between the clip and the frame for which it was designed. Therefore, it would be desirable to have a retaining arrangement for a vehicle seat that was able to accommodate different seat frames and provided a secure fit even in the presence of manufacturing variations and tolerance stack-up.

SUMMARY

At least some embodiments described herein may include a retaining arrangement for a vehicle seat that has a support structure and a cover material. The retaining arrangement may include a first leg including at least one first retention feature, and a second leg connected to the first leg. The second leg may include a plurality of second retention features positioned along a length of the second leg. The second leg may be configured to cooperate with the first leg to capture a portion of the support structure between the first leg and second leg. In at least some embodiments, both the first and the second legs may include a plurality of respective retention features, which may be configured as barbs or teeth. In at least some embodiments, the first retention features may be configured—i.e., sized and shaped—differently from the second retention features; and further, in at least some embodiments some or all of the first retention features may be different from some or all of the other first retention features, and some or all of the second retention features may be different from some or all of the other second retention features.

At least some embodiments described herein may include a retaining arrangement for a vehicle seat that has a support structure and a cover material. The retaining arrangement may include a first elongated member having a free end and a fixed end, and may also include a second elongated member having a free end and a fixed end connected to the fixed end of the first elongated member. The retaining arrangement may also include plurality of retention features disposed on the first and second elongated members and configured to contact the support structure and retain the first and second elongated members thereon when the support structure is positioned between the first and second elongated members. At least one of the first elongated member or the second elongated member may include a plurality of the retention features.

At least some embodiments described herein may include a retaining arrangement for a vehicle seat that has a support structure and a cover material. The retaining arrangement may include a first elongated member, a second elongated member, and a base portion connecting and cooperating with the first and second elongated members to define a retaining space therebetween. The retaining arrangement may also include a plurality of retention features disposed on the first and second elongated members and extending into the retaining space.

At least some embodiments described herein may include a retaining arrangement for a vehicle seat having a support structure and a cover material. The retaining arrangement may include a first elongated member having a free end and a fixed end, and a second elongated member having a free end and a fixed end connected to the fixed end of the first elongated member. At least one of the first or second elongated member may extend away from the other of the first or second elongated member at an angle such that a distance between the free ends of the first and second elongated members is greater than a distance between the fixed ends of the first and second elongated members. The retaining arrangement may also include a plurality of retention features disposed on the first and second elongated members and configured to contact the support structure and retain the first and second elongated members thereon when the support structure is positioned between the first and second elongated members.

At least some embodiments described herein may include a retaining arrangement for a vehicle seat having a support structure and a cover material. The retaining arrangement may include a first leg having at least one first retention feature, and a second leg connected to the first leg at a base portion and including at least one second retention feature. Each of the at least one retention feature of the first leg is positioned closer to the base that each of the at least one retention feature of the second leg. The second leg is configured to cooperate with the first leg to capture a portion of the support structure between the first leg and the second leg.

At least some embodiments described herein may include a retaining arrangement for a vehicle seat having a support structure and a cover material. The retaining arrangement may include a first elongated member and a second elongated member. A base portion connects the first and second elongated members to define a retaining space therebetween. At least one of the first or second elongated member extends away from the other of the first or second elongated member at an angle such that a width of the retaining space increases as the first and second elongated members extend away from the base. A plurality of retention features are disposed on the first and second elongated members and extend into the retaining space.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
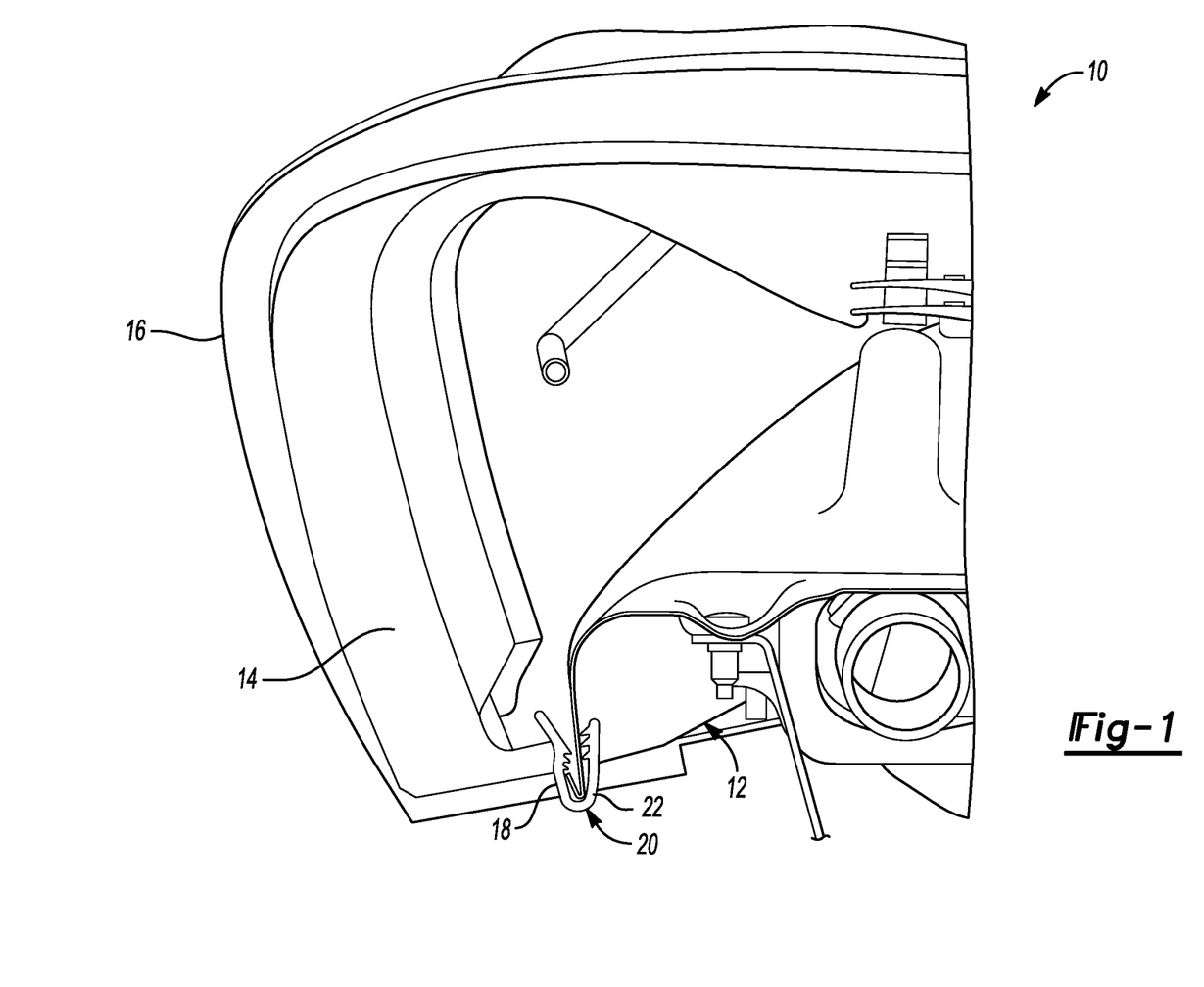
FIG. 1 shows a portion of a vehicle seat including a retaining arrangement in accordance with embodiments described herein.

FIG. 1 shows a portion of a vehicle seat 10 including a support structure or frame 12, a cushion material 14 supported on the seat frame 12, and a cover material or trim cover 16 wrapped around an outside of the cushion material 14. An end 18 of the trim cover 16 is attached to the seat frame 12 with a retaining arrangement 20 in accordance with embodiments described herein. As described in more detail below, the retaining arrangement 20 includes a clip 22 that is configured to accommodate seat frames of various different sizes and configurations. The retaining arrangement 20 may also include a cloth material attached to the clip 22 and sewn to the trim cover 16. In at least some embodiments, the cloth material may be brought into contact with the clip 22 as it is extruded through an extrusion die, thereby forming a strong bond between the cloth material and the clip 22. In other embodiments, the cloth material may be attached to the clip 22 with adhesive or sewn directly to it; and in still other embodiments, a trim cover, such as the trim cover 16 may be attached directly to the clip 22 using any effective means of attachment, including those described above.

Figure 2:
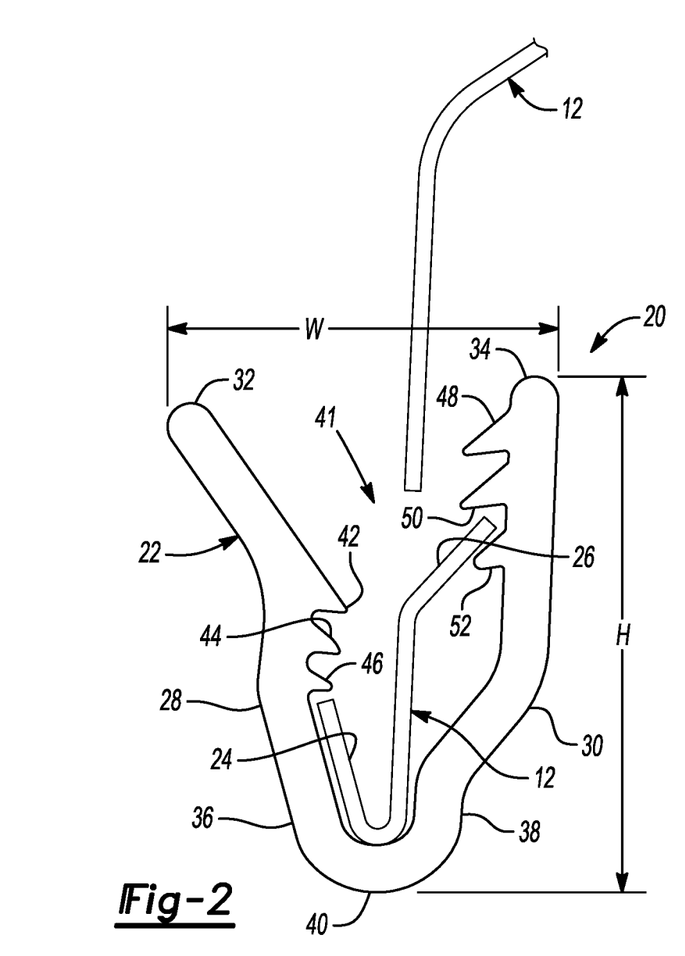
FIG. 2 shows a cross-sectional view of the retaining arrangement attached to a portion of a seat frame.

FIG. 2 shows a cross-sectional view of the retaining arrangement 20, and in particular, the clip 22 as it is attached to a portion of the seat frame 12. As shown in FIG. 2, the seat frame 12 includes a flange 24 and a tab 26, often called a "lance tab". As shown in FIG. 2, the clip 22 includes a first elongated member or leg 28 and a second elongated member or leg 30. Each of the legs 28, 30 has a respective free end 32, 34 and a respective fixed end 36, 38. The clip 22 also includes a base portion 40 that connects the first and second legs 28, 30 at their respective fixed ends 36, 38. The base 40 cooperates with the first and second legs 28, 30 to define a retaining space 41. In at least some embodiments, a clip, such as the clip 22, may have a width (W) of approximately 15 millimeters (mm) and a height (H) of approximately 20 mm.

As shown in FIG. 2, the first leg 28 includes a plurality of first retention features, which in this embodiment are configured as barbs or teeth 42, 44, 46. Similarly, the second leg 30 includes a plurality of second retention features, which in this embodiment are also configured as barbs or teeth 48, 50, 52. In the embodiment shown in FIG. 2, all of the retention features 42, 44, 46, 48, 50, 52 extend into the retaining space 41. With reference to the first and second legs 28, 30 and the first and second retention features 42, 44, 46 and 48, 50, 52, the labels "first" and "second" are arbitrary and may be applied to either of the elongated members or legs forming a part of the clip 22. Although the embodiment shown in FIG. 2 includes three of the retention features on each of the two legs 28, 30, other embodiments may include more or fewer than three of the retention features, and each leg may have a different number of the retention features—e.g., the first leg may have two retention features and the second leg may have four.

In the embodiment shown in FIG. 2, the first retention features 42, 44, 46 are all configured—e.g., sized and shaped—slightly differently from each other. Conversely, the second retention features 48, 50 are configured to be the same, while the remaining retention feature 52 of the second retention features is slightly smaller. In other embodiments, all of the retention features on both legs may be configured to be the same, or the retention features on the first leg may all be configured to be the same and the retention features on the second leg may all be configured to be the same, while the retention features on the first and second legs are different from each other. In at least some embodiments, at least one of the first or second legs may include a single retention feature while the other of the first or second legs contains a plurality of the retention features.

In addition to the differences mentioned above, the retention features of each of the legs 28, 30 are disposed at different positions along a length of their respective legs 28, 30. More specifically, in the embodiment shown in FIG. 2, each of the retention features 42, 44, 46 of the first leg 28 is positioned closer to the base 40 than each of the retention features 48, 50, 52 of the second leg 30. This may further increase the retention capability of the clip 22, by positioning the teeth where they are most likely to encounter features of a seat frame, such as the frame 12.

Figure 3:
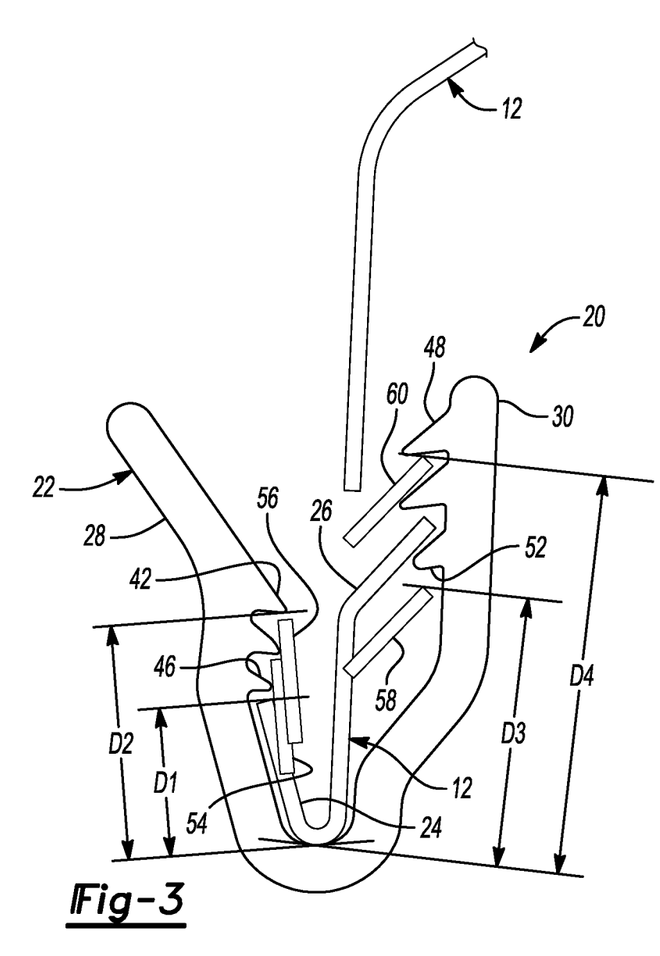
FIG. 3 shows a number of potential configurations for different seat frames and how the retaining arrangement cooperates with each.

As shown in FIG. 2, the seat frame 12, and in particular, the flange 24 is retained by the third tooth 46 on the first leg 28 and the lance tab 26 is retained by second tooth 50 on the second leg 30. With the seat frame 12, a relatively small retention clip may be effective to secure a trim cover to the vehicle seat; however, as shown in FIG. 3, seat frames may be configured quite differently from the one shown in FIG. 2. For reference, the seat frame 12 is also shown in FIG. 3 along with the flange 24 and the lance tab 26. Also shown in FIG. 3 are other configurations for a flange and lance tab associated with a vehicle seat frame. More specifically, FIG. 3 shows flanges 54, 56 and lance tabs 58, 60 representing seat frames of different sizes or configurations.

In the embodiment shown in FIG. 3, the flange 24 has a dimension (D1) that represents a minimum length for the flange associated with the clip 22, and therefore is retained by the third tooth 46 on the first leg 28. A maximum length for a flange associated with the clip 22 is the flange 56 schematically illustrated as having a length dimension (D2). When the clip 22 is attached to a seat frame configured with a flange such as the flange 56, the first tooth 42 on the first leg 28 is used to retain and capture the flange 56. A similar configuration is associated with the lance tabs. For example, the lance tab 58 is associated with a dimension (D3) that is the minimum dimension from the bottom of the seat frame 12 and therefore cooperates with the third tooth 52 on the second leg 30. The lance tab 60 is associated with a dimension (D4) that is the maximum dimension from the bottom of the seat frame 12 and therefore cooperates with the first tooth 48 on the second leg 30. Therefore, as illustrated in FIG. 3, retention arrangements, such as the retention arrangement 20, including clips such as the clip 22, are configured to accommodate support structures in vehicle seats having a wide variety of configurations and to accommodate variations in manufacturing and tolerance stack-up within a single seat-frame design.

Figure 4A:
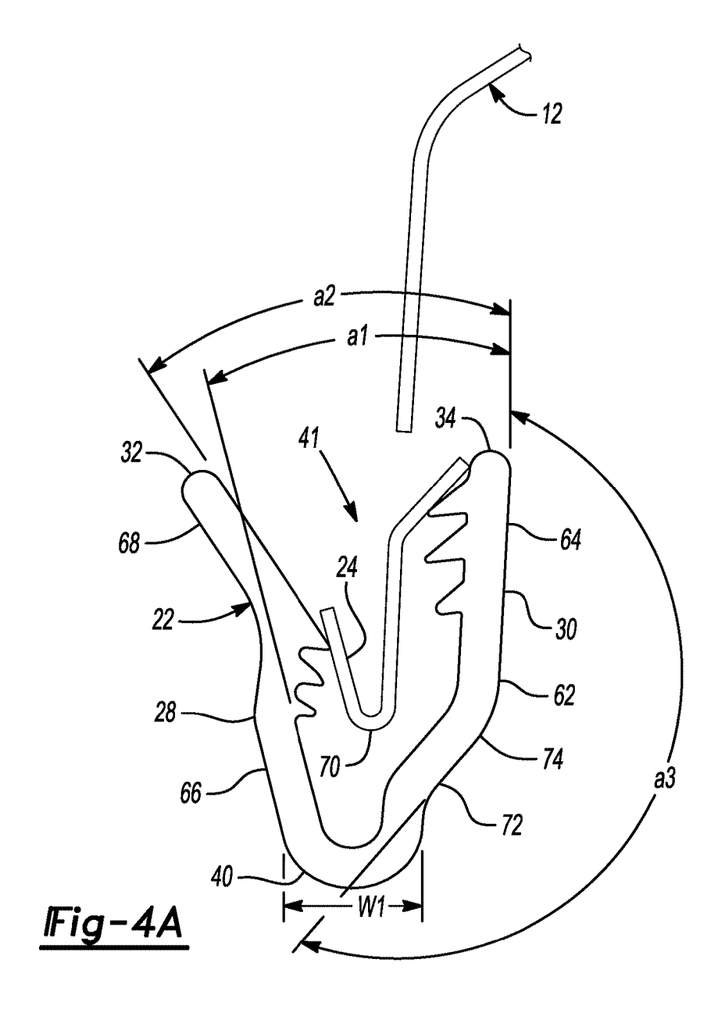
FIGS. 4A-4E show a retaining arrangement in accordance with embodiments described herein as it is being attached to a seat frame.

FIGS. 4A-4E show a progression as the clip 22 is attached to the seat frame 12. In FIG. 4A, the clip 22 is in its "as extruded" form—i.e., it has not undergone any deformation as a result of its being attached to the seat frame 12. As shown in FIG. 4A, the clip 22 is not exactly U-shaped, but rather, has several variant features. First, the first leg 28 extends somewhat to the left as shown in the drawing figure. In the embodiment shown in FIG. 4A, the leg 28 extends outward at two different angles. Using an outside edge 62 of an upper portion 64 of the second leg 30 as a reference datum, a first angle (a1) can be defined between the outside edge 62 and a lower portion 66 of the first leg 28. In at least some embodiments, the angle (a1) may be approximately 17°. An upper portion 68 of the first leg 28 also angles outward, but at a second angle (a2) that is greater than the first angle (a1). In the embodiment shown in FIG. 4A, the angle (a2) may be, for example, approximately 37°. The configuration of the first leg 28 angling outward may help to facilitate insertion onto a seat frame, such as the seat frame 12, particularly where the flange 24 is positioned at an angle.

Another variant from a conventional U-shape is seen at the base 40, which has a width (W1) that is less than the width (W) between the first and second legs 28, 30—see also FIG. 2. Therefore, the distance between the free ends 32, 34 of the first and second elongated members 28, 30 is greater than a distance between the fixed ends 36, 38 of the first and second elongated members 28, 30. The difference in width is not just because the first leg 28 angles outward; rather, it is also a result of the base 40 being "pinched in"—i.e., the base 40 is specifically extruded with a narrower width than at the upper ends 32, 34 of the legs 28, 30. This helps to maintain a more secure fit at a bottom portion 70 of the seat frame 12. As shown in FIG. 4A, the second leg 30 also angles outward and transitions to a wider width at an inflection point 72. Again using the outside edge 62 as a reference, a lower portion 74 of the second leg forms an angle (a3) with the outside edge 62 of approximately 215°. In general, at least one of the first or second legs 28, 30 extends away from the other of the first or second legs 28, 30 at an angle such that the width of the retaining space 41 increases as the first and second legs 28, 30 extend away from the base 40. Although the angles (a1), (a2), and (a3) shown in FIG. 4A provide an attachment arrangement 20 that functions well for a variety of seat-frame configurations, other embodiments of attachment arrangements as described herein may have different dimensions, including linear and angular dimensions, depending on the particular applications for which they will be used.

Figure 4B:
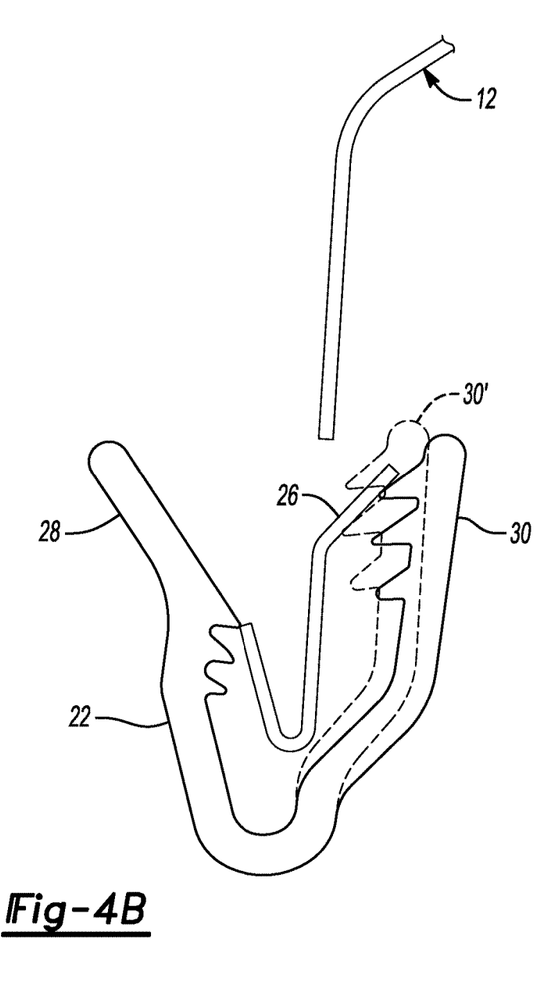
Figure 4C:
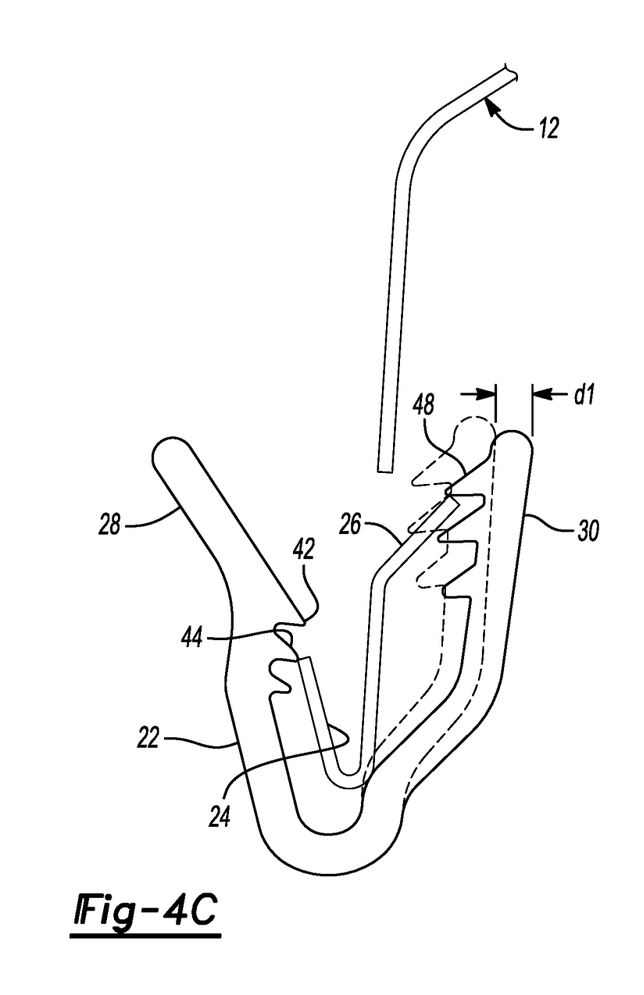

FIG. 4B shows the clip 22 as it begins to be inserted onto the seat frame 12. As shown in FIG. 4B, the second leg 30 begins to flex as it slides over the lance tab 26. For comparison, the second leg in its unflexed state is shown in phantom and is labeled 30'. In FIG. 4C, the clip 22 has been inserted onto the seat frame 12 so that the edge of the flange 24 is positioned at the second tooth 44 on the first leg 28. Conversely, the edge of the lance tab 26 is positioned only at the first tooth 48 on the second leg 30. In this position, the second leg 30 is moved outward by a deflection (d1), which in this embodiment may be approximately 1.5 mm.

Figure 4D:
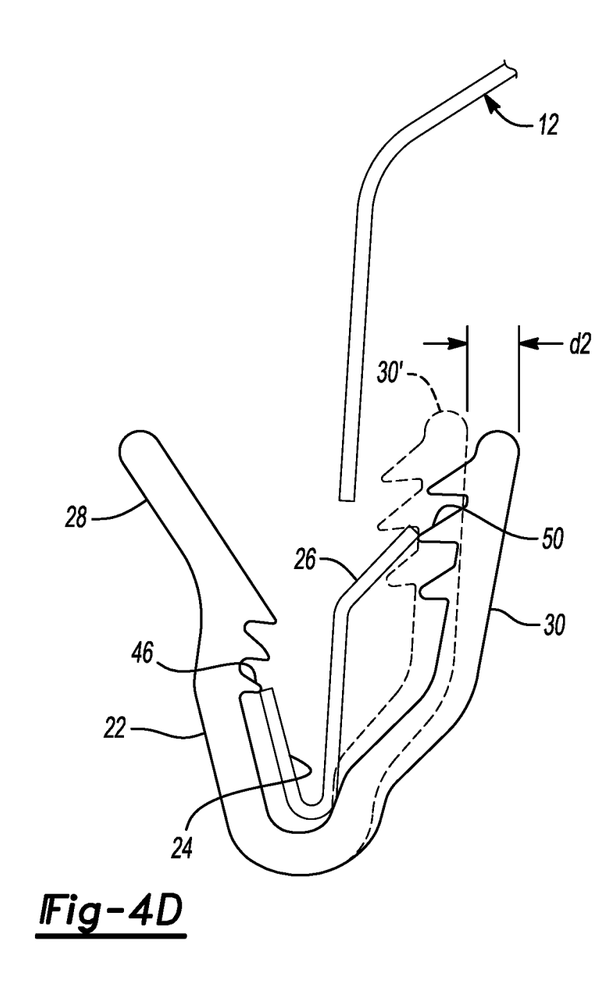
Figure 4E:
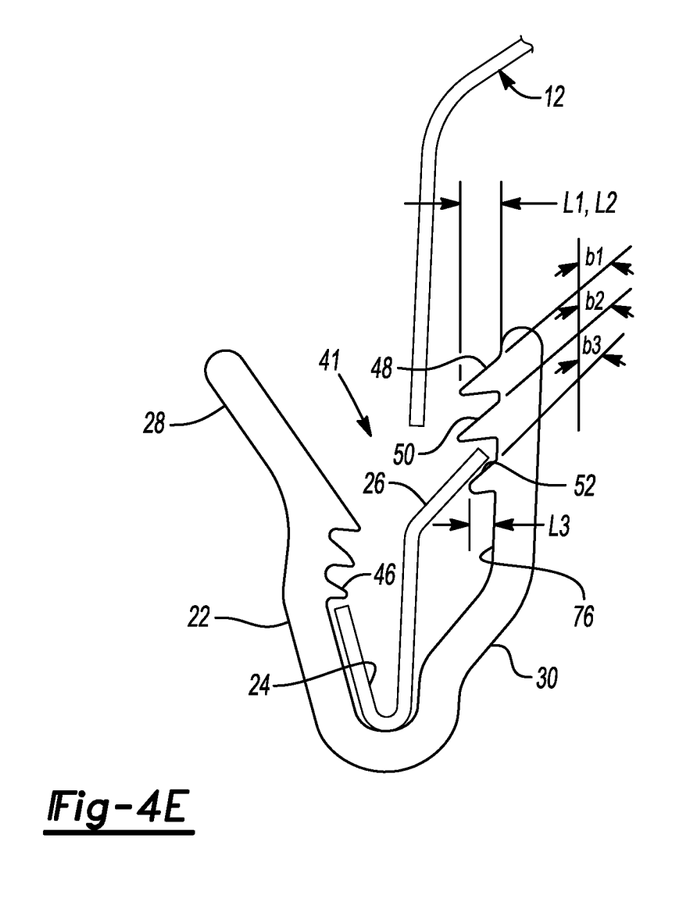

In FIG. 4D, the clip 22 is inserted farther onto the seat frame 12. Specifically, the end of the flange 24 is now positioned at the third tooth 46 on the first leg 28 and the end of the lance tab 26 is positioned at the second tooth 50 of the second leg 30. This causes the second leg 30 to move even farther outward by a deflection (d2), which in this embodiment may be approximately 2 mm. To accommodate this deflection—and perhaps significantly more deflection in other embodiments—a clip, such as the clip 22 may be made from a flexible polymer, such as polypropylene or a polypropylene material with talc filler. Finally, in FIG. 4E, the clip 22 is fully seated on the seat frame 12 with the flange 24 being secured under the third tooth 46 of the first leg 28 and the lance tab 26 being secured under the second tooth 50 of the second leg 30. In FIG. 4E, the clip 22 is once again in an undeformed state, and the lower portion 66 of the first leg 28 is angled so that matches or nearly matches the angle of the flange 24. These features may advantageously contribute to the retention capability of the clip 22.

As described above and shown in FIG. 4E, the third tooth 52 is slightly smaller than the other two teeth 48, 50 on the second leg 30. More specifically, each of the teeth 48, 50, 52 defines a respective length (L1), (L2), (L3) from a surface 76 of the second leg 30, and the length (L3) of the third tooth 52 is less than the respective lengths (L2), (L3) of the teeth 48, 50. In this embodiment, the lengths (L2) and (L3) are the same, although in other embodiments, each of the teeth may be different lengths or all the same. Each of the teeth 48, 50, 52 also defines a respective angle (b1), (b2), (b3) with the surface 76 of the second leg 30. In addition, to a difference in length between the teeth 48, 50, 52, the third tooth 52 forms an angle (b3) with the surface 76 that is somewhat less than angles (b1), (b2) of the first and second teeth 48, 50.

In general, at least one of the retention features 48, 50, 52 of the second leg 30 extends farther into the retaining space 41 than at least one other of the retention features 48, 50, 52, and at least one of the retention features 48, 50, 52 extends into the retaining space 41 at an angle that is different from at least one other of the retention features 48, 50, 52. Both the linear and angular differences between the teeth 48, 50, 52 on the same leg 30 may help to seat the lance tab 26 more securely as shown in FIG. 4E. In other embodiments, the differences between the retention features may be more prominent than illustrated on the clip 22, or the retention features may be configured to be the same or nearly the same.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A retaining arrangement for a vehicle seat having a support structure and a cover material, comprising:

a first elongated member having a free end and a fixed end, and including an upper portion and a lower portion;

a second elongated member having a free end and a fixed end connected to the fixed end of the first elongated member, at least one of the first or second elongated member extending away from the other of the first or second elongated member at an angle such that a distance between the free ends of the first and second elongated members is greater than a distance between the fixed ends of the first and second elongated members; and a plurality of retention features disposed on the first and second elongated members and configured to contact the support structure and retain the first and second elongated members thereon when the support structure is positioned between the first and second elongated members, and wherein the lower portion of the first elongated member extends away from the second elongated member at a first angle, and the upper portion of the first elongated member extends away from the second elongated member at a second angle greater than the first angle.

2. The retaining arrangement of claim 1, further comprising a base portion connecting the fixed end of the first elongated member with the fixed end of the second elongated member to define a retaining space therebetween, and wherein the retention features extend into the retaining space such that each retention feature of the first elongated member is positioned closer to the base portion than each retention feature of the second elongated member.

3. The retaining arrangement of claim 1, wherein the second elongated member includes an upper portion and a lower portion, and wherein the first angle is formed between the upper portion of the second elongated member and lower portion of the first elongated member, and the second angle is formed between the upper portion of the second elongated member and the upper portion of the first elongated member.

4. The retaining arrangement of claim 3, further comprising a base portion connecting the fixed end of the first elongated member with the fixed end of the second elongated member, and wherein the lower portion of the second elongated member extends away from the base portion and forms a third angle with the upper portion of the second elongated member.

5. The retaining arrangement of claim 4, wherein the second elongated member includes a plurality of the retention features, each of the retention features of the second elongated member defining a respective length from a surface of the second elongated member and a respective angle with the surface of the second elongated member, and wherein at least one of the retention features of the second elongated member forms an angle with the surface of the second elongated member that is different from an angle formed by at least one other of the retention features with the surface of the second elongated member.

6. The retaining arrangement of claim 5, wherein the respective length of at least one of the retention features of the second elongated member is less than the respective length of at least one other of the retention features of the second elongated member.

7. A retaining arrangement for a vehicle seat having a support structure and a cover material, comprising:
a first leg including at least one first retention feature; and
a second leg connected to the first leg at a base portion and including a plurality of second retention features disposed at different positions along a length of the second leg, each of the at least one first retention feature of the first leg being positioned closer to the base portion than each of the second retention features of the second leg, and wherein the second leg is configured to cooperate with the first leg to capture a portion of the support structure between the first leg and the second leg.

8. The retaining arrangement of claim 7, wherein each of the first and second legs includes a respective free end and a respective fixed end, and wherein at least one of the first or second legs extends away from the other of the first or second legs at an angle such that a distance between the free ends of the first and second legs is greater and a distance between the fixed ends of the first and second legs.

9. The retaining arrangement of claim 7, wherein the first leg includes an upper portion and a lower portion, and the lower portion extends away from the second leg at a first angle, and the upper portion extends away from the second leg at a second angle greater than the first angle.

10. The retaining arrangement of claim 9, wherein the second leg includes an upper portion and a lower portion, and wherein the first angle is formed between the upper portion of the second leg and lower portion of the first leg, and the second angle is formed between the upper portion of the second leg and the upper portion of the first leg.

11. The retaining arrangement of claim 10, further comprising a base portion connecting the lower portions of the first and second legs and defining a retaining space therebetween, and wherein the lower portion of the second leg extends away from the base portion and forms a third angle with the upper portion of the second leg.

12. The retaining arrangement of claim 11, wherein the second retention features extend into the retaining space, and wherein at least one of the second retention features extends farther into the retaining space than at least one other of the second retention features.

13. The retaining arrangement of claim 11, wherein at least one of the second retention features extends into the retaining space at an angle that is different from at least one other of the second retention features.

14. A retaining arrangement for a vehicle seat having a support structure and a cover material, comprising:
a first elongated member;
a second elongated member;
a base portion connecting the first and second elongated members to define a retaining space therebetween, at least one of the first or second elongated member extending away from the other of the first or second elongated member at an angle such that a width of the retaining space increases as the first and second elongated members extend away from the base portion; and
a plurality of retention features disposed on the first and second elongated members and extending into the retaining space, and wherein the second elongated member includes a plurality of the retention features extending into the retaining space, at least one of the retention features of the second elongated member extending farther into the retaining space than at least one other of the retention features of the second elongated member.

15. The retaining arrangement of claim 14, wherein the retention features extend into the retaining space such that each retention feature of the first elongated member is positioned closer to the base portion than each retention feature of the second elongated member.

16. The retaining arrangement of claim 14, wherein the first elongated member includes an upper portion and a lower portion, and the lower portion extends away from the second elongated member at a first angle, and the upper portion extends away from the second elongated member at a second angle greater than the first angle.

17. The retaining arrangement of claim 16, wherein the second elongated member includes an upper portion and a lower portion, and wherein the first angle is formed between the upper portion of the second elongated member and lower portion of the first elongated member, and the second angle is formed between the upper portion of the second elongated member and the upper portion of the first elongated member.

18. The retaining arrangement of claim 17, wherein the lower portion of the second elongated member extends away from the base portion and forms a third angle with the upper portion of the second elongated member.

\* \* \* \* \*